United States Patent
Yepez, III et al.

(10) Patent No.: US 7,310,317 B2
(45) Date of Patent: Dec. 18, 2007

(54) APPARATUS AND METHOD FOR DE-PRIORITIZATION OF BYPASS PACKETS IN A PACKET BASED COMMUNICATION SYSTEM

(75) Inventors: Esteban Yepez, III, Albuquerque, NM (US); Garrett P. Splain, Streamwood, IL (US); Rangrong Ma, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 204 days.

(21) Appl. No.: 10/082,483

(22) Filed: Feb. 25, 2002

(65) Prior Publication Data

US 2003/0161294 A1 Aug. 28, 2003

(51) Int. Cl.
*G01R 31/08* (2006.01)
(52) U.S. Cl. .............. 370/252; 370/412; 370/328; 370/337; 370/347; 455/422.1
(58) Field of Classification Search .......... 370/229, 370/230, 230.1, 231, 235, 412, 394, 401, 370/465, 353, 418
See application file for complete search history.

(56) References Cited

U.S. PATENT DOCUMENTS

| | | | | |
|---|---|---|---|---|
| 4,707,831 A | * | 11/1987 | Weir et al. | 370/416 |
| 5,224,009 A | * | 6/1993 | Misencik | 361/56 |
| 5,526,497 A | | 6/1996 | Zilka et al. | |
| 5,608,779 A | * | 3/1997 | Lev et al. | 455/436 |
| 5,793,810 A | * | 8/1998 | Han et al. | 375/242 |
| 6,009,383 A | | 12/1999 | Mony | |
| 6,034,994 A | * | 3/2000 | Yoon | 375/242 |
| 6,070,089 A | * | 5/2000 | Brophy et al. | 455/560 |
| 6,272,358 B1 | * | 8/2001 | Brent et al. | 455/560 |
| 6,480,491 B1 | * | 11/2002 | Miao | 370/394 |
| 6,707,825 B1 | * | 3/2004 | Turner et al. | 370/467 |
| 2002/0095498 A1 | * | 7/2002 | Chanda et al. | 709/225 |

FOREIGN PATENT DOCUMENTS

WO  WO-00/42789 A1  7/2000

OTHER PUBLICATIONS

International Search Report for Application No. PCT/US03/01008 dated Aug. 6, 2003.

* cited by examiner

*Primary Examiner*—Duc Ho

(57) ABSTRACT

A method and apparatus for de-prioritizing mobile-to-mobile calls in favor of mobile-to-landline calls in a communication system. De-prioritizing mobile-to-mobile calls, which are less sensitive to infrastructure delays due to to their bypass of encoding and decoding steps, allows more delay sensitive mobile-to-landline calls requiring extra processing time due to encoding and decoding to be transmitted over a communication system first. A control processor creates a modified FIFO queue to effect a queuing scheme to de-prioritize mobile-to-mobile calls. Application of the de-prioritizing scheme in a packet based network affords an increase in the quality of mobile-landline calls while not adversely affecting quality of service for mobile-to-mobile calls.

8 Claims, 2 Drawing Sheets

APPARATUS AND METHOD FOR DE-PRIORITIZATION OF BYPASS PACKETS IN A PACKET BASED COMMUNICATION SYSTEM

BACKGROUND

The present invention relates to an apparatus and method for de-prioritizing bypass packets in a frame relay system and, more particularly, effecting a prioritization scheme in a transcoder where access to a packet based network by mobile-to-mobile calls is given lower priority than calls between mobile users and landline users.

In the area of cellular telephony, a plurality of base stations each serving mobile wireless telephone users are connected together via an infrastructure that routes calls from a base station to another base station and also to existing landline based public switch telephone networks (PSTN's). Although various methods of communicating signals from base sites to their serving base stations exist, increasingly in wireless infrastructure systems packet based networks, such as frame relay, have been adopted to handle voice traffic as frame relay affords efficient use of bandwidth and lower cost as opposed to traditional voice or circuit switching networks.

Because frame relay was originally designed to handle bursty traffic data, packet switching networks such as frame relay are inherently less efficient than circuit switching networks in dealing with voice traffic, which tends to be periodic and less random. In order to achieve good voice quality, the delay of voice packets across the frame relay network must be minimal. Hence, when multiple users are vying for access to a frame relay pipe that is configured for serial transmission, in particular, minimal delay of voice communication signals becomes critical.

Another concern about voice traffic is that for mobile-to-landline calls, encoded wireless communication signals from a mobile station to a base station must be decoded by a voice processor in a transcoder (i.e., a device performing both encoding and decoding) at the base site before the voice information is sent to a PSTN. This step of decoding the signal from the wireless user presents additional delay to the voice traffic signals. In order to mitigate this delay, as well as prevent audio degradation due to double transcoding, wireless systems typically employ a bypass scheme that allows voice information sent from one mobile station to another mobile station to "bypass" the decoding and encoding steps performed in the transcoders of the base sites, thereby eliminating the delay inherent with these steps.

As mentioned above, voice processors in a base site must still vie for access to the frame relay pipe. Typically a control processor, which controls access of the voice processors to the serial frame relay pipe, allows frame relay access to the voice processors one at a time based on the order they come in. This is typically referred to as a FIFO (first in, first out) queue.

Thus, in a typical transcoder pool comprised of one control processor and 12 voice processors, for example, a packet transmission could be delayed by 11×(packet transmission time) milliseconds if all 12 voice processors have packets to send on the frame relay pipe at roughly the same time in a worst case scenario. Accordingly, no discrimination is made between bypass mode calls and normal mode calls (e.g., mobile-to-landline or vice versa) and, thus, normal calls requiring extra processing time for vocoding may be placed at the end of the FIFO queue and be transmitted after bypass calls requiring no decoding or encoding.

DESCRIPTION OF THE PREFERRED EMBODIMENTS

The disclosed method and apparatus provide a transcoder for receiving and transmitting communication signals over a packet based network, such as a frame relay network. The frame relay network, in particular, is configured to direct the communication signals to and from the transcoder to a frame relay pipe, which distributes packets to the appropriate base stations. Within each transcoder are included one or more voice processors that encode and decode the communication signals. Also included is a control processor that is configured to control access of the voice processors to the frame relay pipe according to a selective queuing scheme. The selective queuing scheme, in particular, may rely on a control flag initialized by the voice processor to indicate whether a call is in bypass mode or standard mode. The control processor may then utilize the control flag to determine the queuing order wherein bypass mode calls are de-prioritized such that they are sent after standard calls onto the frame relay pipe.

Figure 1:
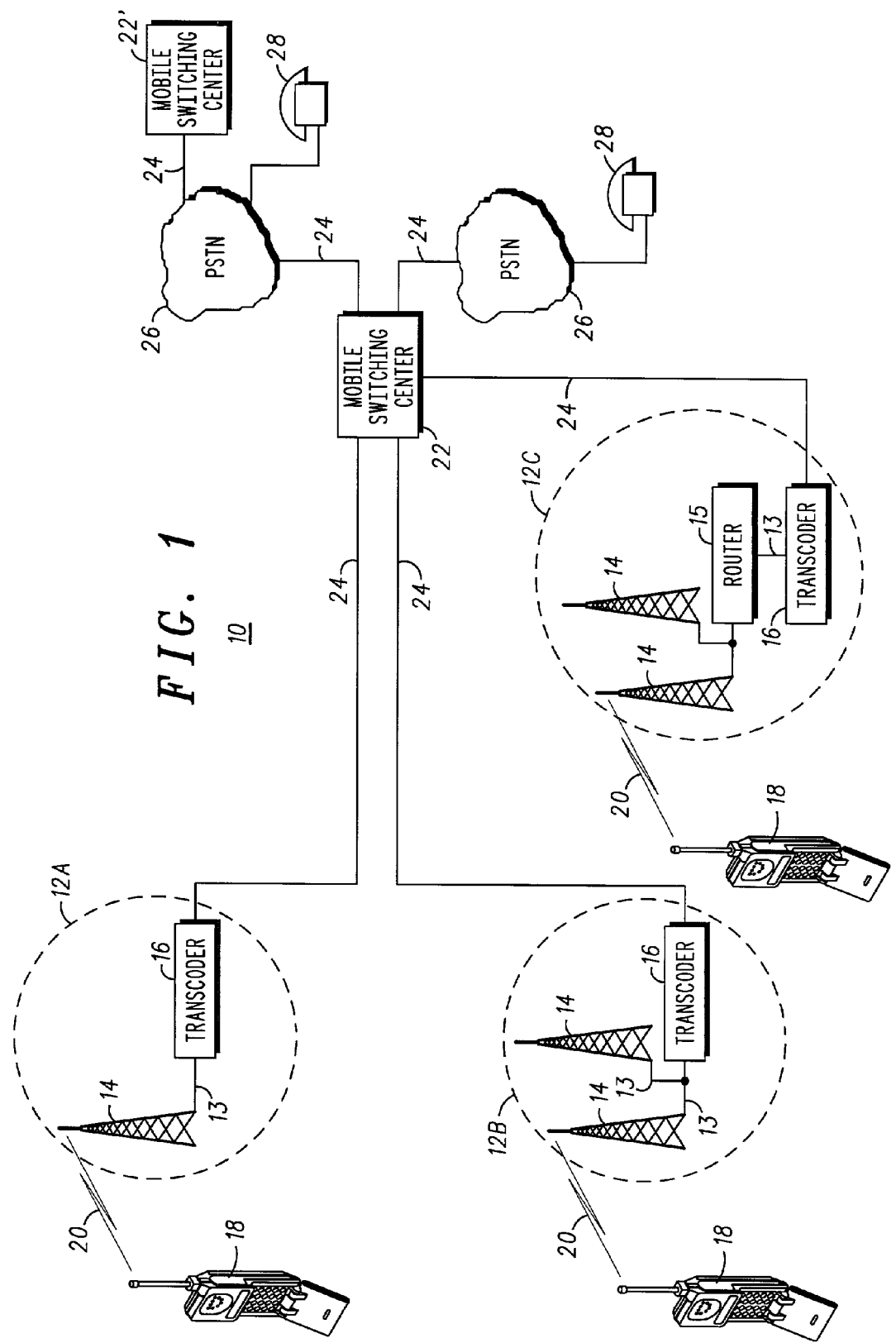
FIG. 1 illustrates an overall diagram of a frame relay communication system according to the present disclosure.

FIG. 1 illustrates a communication system 10 that includes both wireless and landline communications. On the wireless side, a number of base sites 12 are included. Within each base site 12 are one or more base stations 14 and transcoders 16 wherein the transcoder 16 effects communications between the base stations 14 over frame relay pipe(s) 13. In communication with the base stations 14 are mobile stations 18 that communicate via a wireless link 20 to the base stations 14.

As shown in FIG. 1, different base site configurations may be envisioned. For example, base site 12a illustrates a configuration wherein the transcoder is connected to a base station 14 directly via a packet based network such as a frame relay pipe 13. Alternatively, base site 12b illustrates an example of a configuration having multiple base stations 14 connected to a transcoder 16 via multiple branches of the frame relay pipe 13. Yet another alternative 12c illustrates the use of a router 13 that routes packets between a transcoder 16 and various base stations 14. It is further noted that multiple transcoders may be employed within a particular base site 12.

Each of the base sites 12 is connected to a mobile switching center (MSC) 22, which, in turn, connects to the transcoders 16 via dedicated connections 24. It is noted that the configuration illustrated in FIG. 1 showing one MSC 22 is merely exemplary and different numbers of MSC's and also different types of network configurations are possible. Also connected to the MSC 22 are public switch telephone networks (PSTN's) 26, which are connected to the MSC 22 with dedicated connections 24 for communication to landlines 28. Communication over the dedicated connections 24 between the various transcoders 16 and the PSTN's, for example, typically are of pulse code modulated (PCM) type whereas communication between transcoders 16 via the dedicated connections may be packet based. Another MSC 22' is also shown connected to a PSTN 26 as an example of ways communication that may be effected to other MSC's. This MSC 22' would, in turn, be connected to additional base sites 12.

Figure 2:
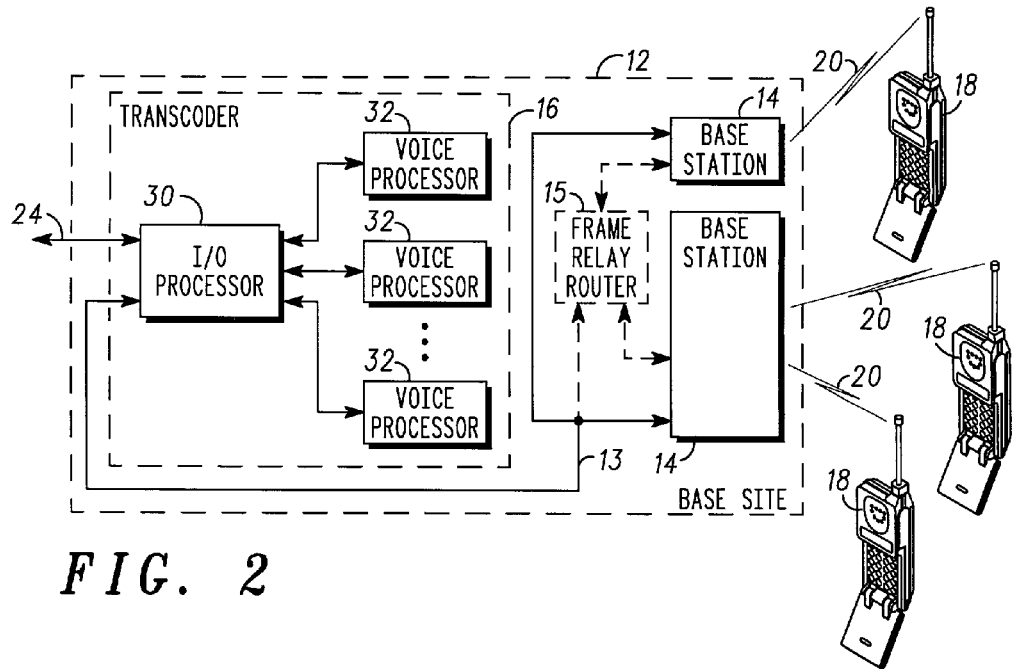
FIG. 2 illustrates a typical arrangement for a base site as illustrated in FIG. 1.

FIG. 2 illustrates an exemplary base site 12 configuration that may be used in the communication system 10 of FIG. 1. As mentioned previously, each base site 12 includes a transcoder 16 that effects communication over the frame relay pipe 13 and the base stations 14 that, in turn, effect communication with a plurality of mobile users 18. Within the transcoders 16 are included a number of voice processors 32 that process communication signals to and from the base stations 14. The voice processors 32 achieve, inter alia, decoding of signals received from the mobile users 18, encoding for signals being sent to the mobile users 18, and also may determine whether or not a call is a mobile-to-mobile call, thereby requiring bypass of the decoding or encoding apparatus within the processor 32, or a mobile-landline call (i.e., what is referred to as a "normal" call), which requires decoding for signals received from the base stations 14 and encoding for signals being sent to the base stations 14.

The transcoders 16 also include an Input/Output (I/O) processor 30 that is used to control access of the voice processors 32 to the frame relay pipe 13. In frame relay systems, in particular, a given transcoder pool (i.e., the control processor and plurality of voice processors) use the frame relay pipe serially. A function of the I/O processor 30 is to arbitrate the requests by the voice processors 32 to access the frame relay pipe 13. As was discussed previously, I/O processors in the conventional art create a FIFO queue that sequentially allows frame relay pipe access to the voice processors one at a time based on the order of the voice processor requests. As will be discussed later, the apparatus and method according to the teachings of the present invention modify the conventional FIFO queue by de-prioritizing bypass calls such that they are placed at the bottom or end of the FIFO queue (i.e., last out).

FIG. 2 also illustrates an alternate configuration wherein a frame relay router 15 is utilized instead of a direct frame relay pipe connection to the base stations 14.

Figure 3:
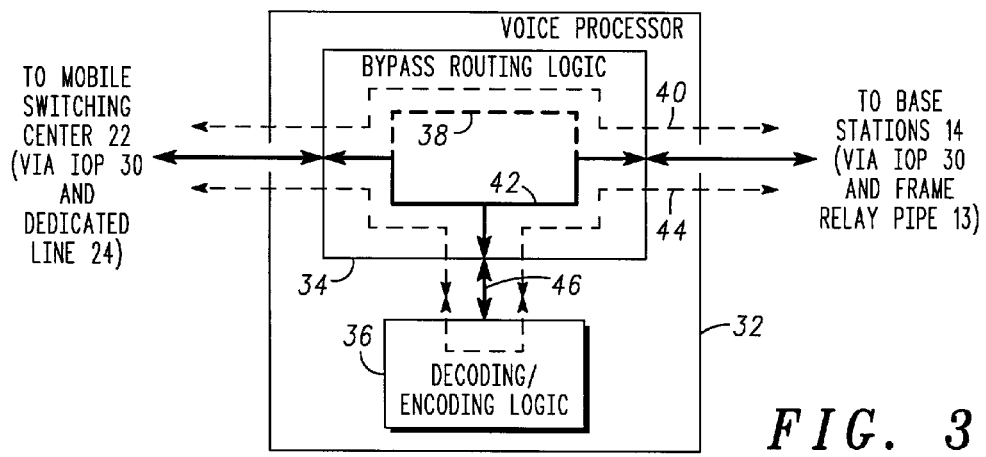
FIG. 3 illustrates a block diagram of a voice processor utilized in the base site shown in FIG. 2.

FIG. 3 illustrates an exemplary voice processor 32 that may be used in the transcoder 16 shown in FIG. 2. Within each voice processor 32 is a bypass routing logic 34 that arbitrates between bypass mode calls and normal calls. Bypass mode calls (i.e., mobile-to-mobile calls) that are being transmitted between the base stations 14 and MSC 22 are illustrated as a dashed line 40 in FIG. 3. As shown, the bypass call 40 is directed via a path 38 in the bypass logic 34 such that no decoding or encoding is performed on the signal. Additionally, the bypass routing logic 34 initiates a control flag associated with the signal 40 being transmitted to a receiving base station that is sent to the I/O processor 30 indicating that the signal is a bypass mode call. The I/O processor 30 utilizes this control flag to differentiate that the signal is a bypass mode call and correspondingly modify the FIFO queue as will be discussed later.

Normal calls 44 (e.g., mobile-to-landline voice, mobile-to-landline video/multimedia, etc.) that are transmitted between the mobile stations 18 and landline connections (e.g., PSTN's) are recognized and determined to be such by the bypass routing logic 34, which directs these signals to the decoding/encoding logic 36 via path 42 and bus 46 for decoding of calls received from the base stations 14 and encoding of calls being delivered to the base stations 14. The bypass routing logic 34 may also attach a control flag to the frame relay pipe request associated with the mobile-to-landline signals 44 indicating to the I/O processor 30 that this is a normal mode call. It is noted that the control flag that enables the I/O processor 30 to differentiate between normal and bypass mode calls may be attached to both requests for bypass and normal mode calls or may be attached to either one of the requests for bypass or normal mode calls, or any other arrangement or means that effects signaling between the voice processors 32 and I/O processor 30 such that the I/O processor 30 may differentiate between requests for bypass and normal mode calls.

When the I/O processor 30 receives a request from a voice processor 32 to access the frame relay pipe 13 for a bypass call, the I/O processor 30 selectively modifies its internal FIFO queue such that the access by the particular requesting voice processor 32 is de-prioritized to give priority to normal mode calls that may be received from other voice processors 32 in the transcoder 16. This internal FIFO queue may be termed a "primary" queue that priorities normal calls and also deprioritizes bypass calls. If there are multiple bypass mobile-to-mobile calls being handled by respective voice processors 32, those bypass signals may be prioritized among themselves in a "secondary" queue based on the order in which they come in, for example, but are always given lower priority than mobile-to-landline calls. Hence, the selective prioritization queuing scheme according to the teachings of the present disclosure allow normal mode calls, which are more sensitive to delay, to be given access to the frame relay pipe 13 before the mobile-to-mobile calls that are less sensitive to delay due to their bypass routing.

As noted previously, the worst case scenario in a transcoder, such as transcoder 16, given a transcoder pool of 12 voice processors, for example, would be a packet transmission delay of 11×(the packet transmission time) milliseconds. Typically, packet transmission time within a transcoder is two milliseconds. Thus, the lowest priority request from a voice processor 32 for access to the frame relay pipe, assuming a total of 12 voice processors, would be delayed by 22 milliseconds before transmitting information on the frame relay pipe 24. It is important, however, in the selective queuing scheme according to the teachings of the present disclosure that the information be transmitted from the voice processor 32 to the frame relay pipe 13 in a prescribed time period to ensure that a voice processor 32 having a de-prioritized bypass call will not be forced to buffer a call indefinitely.

It has been recognized by the inventors in the present application that the characteristics of the infrastructure of a communication system such as system 10 affords the ability to deprioritize mobile-to-mobile bypass calls without degradation of the mobile-to-mobile quality of service. Specifically, it has been recognized that the bypass end-to-end delay contribution from a typical communication system infrastructure is mostly determined by the radio frequency (RF) time slot assignments of each mobile station 18 within a base site infrastructure 12. Hence, the traversal time of audio signal packets over the infrastructure (i.e., travel of a signal from a mobile station to a base station to a mobile switching center, back to a target base station and finally to a target mobile station) is not very significant as compared to the effects of time slot assignments.

Figure 4:
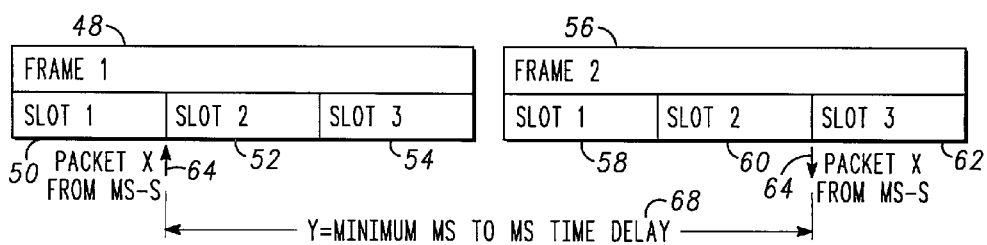
FIG. 4 illustrates a frame construction for a 3:1 frame system.

As an illustration, FIG. 4 shows a frame construction for a 3:1 RF system having a frame period of 45 milliseconds. As shown, a first frame 48 and second frame 56 each include three RF slots (50, 52, 54 and 58, 60, 62, respectively) that are each 15 milliseconds wide. For this example, it is assumed that a source mobile station (MS-S) (e.g., a mobile telephone 18) is assigned to RF slot 1 (50 and 58) and a target mobile station (MS-T) is assigned to RF slot 2 (52 and 60) and mobile-to-mobile communication occurs with mobile stations served by the same base station 14 within a base site 12. Additionally, it is assumed that the receive and transmit RF slots are aligned (i.e., the base station transmits and receives packets for an RF slot simultaneously or, in other words, operates in full-duplex).

FIG. 4 illustrates a packet X that is received from a source mobile station MS-S illustrated by arrow 64. This packet is received during the 15 millisecond time of slot 1 (50). Thus, a minimum time delay for the packet X to be transmitted from the source mobile station MS-S to the target mobile station MS-T is equal to a variable Y and illustrated by arrow 68 in FIG. 4. As shown, this time delay Y is minimally the frame period of 45 milliseconds plus the slot time required to deliver the packet. In the example of FIG. 4, since the target station MS-T is assigned to slot 2, the minimum delay is equal to the times of slots 2 and 3 (52 and 54) of the first frame 48 in addition to the time of slot 1 (58) of the second frame (56) as well as the time of slot 2 (60) of the second frame (56) since packet X is delivered to the target mobile station MS-T throughout the time period of this slot 2 (60) as illustrated by arrow 66 at the end of this slot.

More generically, the minimum delay for a packet may be represented by the following equations:

$$\min(Y)=45\ msec+15\ msec\times[(RF\ \text{slot number of the target mobile station})-(RF\ \text{slot number of the source mobile station})];$$ for instances when the slot number of the target mobile station MS-T is greater than the RF slot number of the source mobile station MS-S.

Or $$\min(Y)=45\ msec+15\ msec\times[(\text{Maximum } RF\ \text{slot number})-(RF\ \text{slot number of the source mobile station})+(RF\ \text{slot number of the target mobile station})]$$ for instances when the RF slot number of the source mobile station MS-S is greater than the RF slot number of the target mobile station MS-T.

Furthermore, if the delay in the infrastructure is greater than the minimum time delay period Y−(1 slot time) (e.g., Y−15 msec in the presently disclosed embodiment), the total delay time will increase due to the infrastructure delay that would cause a missed slot since the packet cannot arrive in time to be transmitted during the accorded slot in the next frame. For example, if the packet transmitted from MS-S during the first slot (50) of frame 1 (48) is delayed by the infrastructure for a period greater than Y−15 msec, the packet will not arrive in time to be transmitted to the target mobile station during the time period of slot 2 (60) of the second frame 56. Thus, the delay will then become the minimum delay Y plus the frame period (i.e., 45 milliseconds) since transmission of packet X will then have to wait until slot 2 of a third frame.

Hence, no benefit is therefore gained in reducing delay in the infrastructure since even a 1 millisecond delay will cause a missing of the next frame and the information cannot be transmitted until the assigned slot in the subsequent frame, even though it may arrive early for that frame. In other words, the transcoder cannot affect, i.e., either improve or degrade, the delay of a mobile-to-mobile interconnect call. Accordingly, de-prioritizing mobile-to-mobile full-duplex calls is acceptable without degrading the signal as long as the additional travel time through the infrastructure does not exceed the frame period (e.g., 45 milliseconds for the given example of FIG. 4).

As was discussed previously, in a system employing 12 voice processors, the maximum additional delay caused by the infrastructure of the base radio transcoder 16 would be typically 22 milliseconds, which is far less than the frame period of 45 milliseconds assuming a 3:1 system. Accordingly, the present de-prioritizing queuing scheme is feasible and does not cause degradation of the mobile-to-mobile voice call quality of service. It is noted that in other frame configurations, such as 6:1 frame systems having 90 millisecond frame periods, the apparatus and method according to the teachings of the present disclosure are all the more feasible. The present apparatus and method are further desirable in that the bandwidth of the frame relay pipe is typically limited due to cost concerns. Thus, the de-prioritization scheme presented herein becomes more beneficial and efficacious.

Although the above example is given in the context of a frame relay protocol, an even more generic characterization of the teachings of the present disclosure may be made. That is, the protocol merely requires that voice data for a mobile wireless user 18 be transmitted and/or received periodically at some assigned offset in a system with a predetermined "n" number of offsets (e.g., 3 slots of 15 milliseconds in the example above) within a time period ranging from 0 to n−1.

It is further noted that the present disclosed system has been described in the context of a frame relay system. However, the teachings of the present disclosure may be utilized in any prioritization scheme for voice packets over a variable rate transport (e.g., IP protocol or other known packet protocols).

It is noted that other mechanisms besides a control flag may be employed to signal an I/O processor that a particular type of call is in process (e.g., a mobile-to-mobile call). As an example, the system may be configured to signal the I/O processor with call type information from a particular base site, a base station or any other network elements that track such information during the call setup. Furthermore, determinations may be made as to whether both calling parties are part of a particular system. Thus, mobile subscribers would have either their phone numbers or some unique identifier located in a home location register (HLR) or a visiting location register (VLR) or any other similar database. This information could then be forwarded to interested network elements (i.e., the I/O processor) via other links used in the call setup or call status signaling to inform the network element that the call is of a particular type for use in de-prioritizing in accordance with the disclosed apparatus and method.

It is further noted that the disclosed data pipe may be either located between a transcoder and a base station, as described herein, or between the transcoders and PSTN's or both. This configuration would be helpful for systems having switches that support shared data pipes for sending PCM packet streams, such as in voice over IP systems where PCM is packetized into an IP packet and transplanted over the Internet.

While the apparatus and method of the present disclosure are considered to be the most practical and preferred embodiments, it is to be understood that the disclosure is not limited to such, but is intended to cover various modifications and arrangements included within the spirit and scope of the appended claims, either literally or under the doctrine of equivalents.

What is claimed is:

1. A communications apparatus comprising:
a communication network configured to handle packet-based traffic;
a voice processor coupled to the communication network;
a control processor configured to assign a queue priority to a communication signal, the communication signal in transit between the communication network and the voice processor, wherein the queue priority is determined at least in part according to whether the communication signal corresponds to a standard call mode or a bypass call mode, wherein the standard call mode corresponds to communication signals that are either decoded or encoded by a transcoder and the bypass call mode corresponds to communication signals that are neither encoded nor decoded by the transcoder.

2. The communication apparatus according to claim 1, wherein the voice processors is configured to insert a control flag into a signal delivered to the control processor, where the control processor utilizes the control flag to determine whether the communication signal corresponds to the standard call mode or the bypass call mode.

3. The communication apparatus according to claim 1, wherein the communication signals that are either decoded or encoded by the transcoder are one of mobile-to-landline and landline-to-mobile calls and the communication signals that are neither encoded nor decoded by the transcoder are mobile-to-mobile calls.

4. The communication apparatus according to claim 1, wherein the control processor is configured to determine the queue priority by placing the communication signal at the bottom of a modified FIFO queue when the communication signal has a control flag indicating that the communication signal corresponds to the bypass mode.

5. A method comprising:
determining a queue priority for a communication signal based at least in part according to whether the communication signal corresponds to a standard call mode or a bypass call mode, wherein the standard call mode corresponds to communication signals that are either decoded or encoded by a transcoder and the bypass call mode corresponds to communication signals that are neither encoded nor decoded by the transcoder;
assigning the queue priority to the communication signal, the communication signal being in transit between a communication network and a voice processor.

6. The method according to claim 5, further comprising
inserting by the voice processor a control flag into a signal delivered to a control processor;
utilizing by the control processor the control flag to determine whether the communication signal corresponds to the standard call mode or the bypass call mode.

7. The method according to claim 5, wherein the communication signals that are either decoded or encoded by the transcoder are one of mobile-to-landline and landline-to-mobile calls and the communication signals that are neither encoded nor decoded by the transcoder are mobile-to-mobile calls.

8. The method according to claim 5, wherein determining the queue priority comprises placing the communication signal at the bottom of a modified FIFO queue when the communication signal has a control flag indicating that the communication signal corresponds to the bypass mode.

* * * * *